United States Patent [19]
Herrera

[11] Patent Number: 5,792,541
[45] Date of Patent: Aug. 11, 1998

[54] MODULAR WORK TOP PANEL WITH RECESSED TOP AND FORMABLE EDGES AND METHOD OF MANUFACTURE

[75] Inventor: Jose Herrera, Oswego, Ill.

[73] Assignee: Allsteel Inc., Aurora, Ill.

[21] Appl. No.: 530,521

[22] Filed: Sep. 19, 1995

[51] Int. Cl.$^6$ ..................................................... B32B 3/12
[52] U.S. Cl. ............................. 428/116; 428/77; 428/78; 428/119; 428/192; 156/293; 156/304.5
[58] Field of Search .................................. 428/116, 192, 428/119, 77, 78; 108/180; 52/782.2, 783.11

[56] References Cited

U.S. PATENT DOCUMENTS 3,676,279   7/1972   Beaver ...................................... 428/73

Primary Examiner—Timothy M. Speer

Attorney, Agent, or Firm—Jones, Day, Reavis & Pogue

[57] ABSTRACT

The present invention is directed to a modular work top panel adapted to provide a work surface. The work top panel includes a core assembly comprising a tray having a bottom panel, a spaced apart top panel and a honeycomb structure extending between the top and bottom panels. First and second chambers are formed between the top and bottom panels on opposite sides of the core assembly. One of many different types of edge members as desired may be inserted into each respective chamber of the core assembly to provide a decorative edge treatment. The opposing edge members form a recess above the top panel which is adapted to receive one of a plurality of different types of work surface panels having a desired pattern and finish. The edge members may be formed to a desired contour before or after assembly to the core assembly by wood cutting machinery or the like.

16 Claims, 2 Drawing Sheets

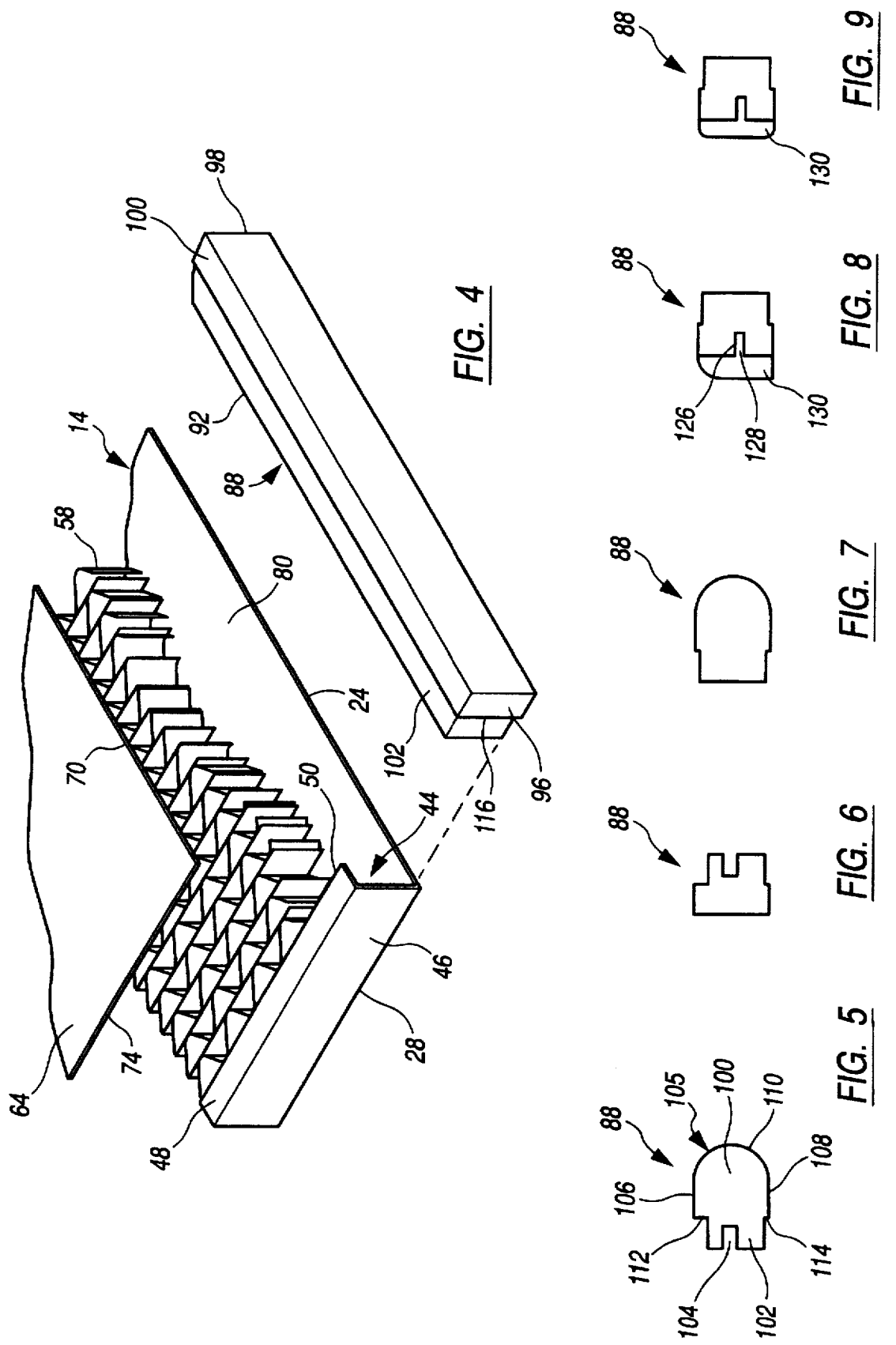

MODULAR WORK TOP PANEL WITH RECESSED TOP AND FORMABLE EDGES AND METHOD OF MANUFACTURE

BACKGROUND OF THE INVENTION

The present invention is directed to a modular work top panel which is usable, for example, as a top for a desk or table, and in particular to a work top panel having a recessed top adapted to receive various different types of ornamental panels, which form the exposed top surface of the top panel and which includes interchangeable edge members, such that edge members having a particular selected configuration may be used with the top panel or which includes edge members that may be formed to a desired configuration prior to or after attachment to the top panel.

Work tops such as the tops of desks and tables typically include a decorative planar work surface usually formed from wood or plastic laminates. Such work tops also typically include decorative edge treatments which may also be made from wood or plastic. Due to the numerous different types of woods and the numerous different types of patterns and finishes of plastic laminates and edging that are available for use with work tops, manufacturers must keep a large number of different types of work tops and edges in inventory in order to provide timely delivery of orders for a number of requested work tops having a work surface with a desired material, pattern and finish and also with the desired edge treatments. The present invention provides a modular work top panel which is adapted to receive various types of edge treatments and work surface materials as requested by a customer, allowing the quick and easy fabrication of the desired style of work top and eliminating the need to maintain a large number of various different styles of work tops and edging in inventory.

SUMMARY OF THE INVENTION

The present invention provides a modular work top panel adapted to provide a work surface. The work top panel includes a core assembly comprising a tray having a bottom panel and first and second channel members respectively located at opposing ends of the tray and attached to the bottom panel. Each channel member includes a wall extending upwardly from the bottom panel and a flange extending inwardly from the top edge of the wall such that the channel members are formed in an inverted L-shape. The bottom panel also includes a first edge extending between the channel members and a second edge spaced apart from and extending parallel to the first edge which also extends between the channel members. A light-weight high-strength honeycomb material is located on the interior surface of the bottom panel and extends between the opposing walls of the channel members. The honeycomb structure also extends between the first and second edges of the bottom panel but is spaced apart from both the first and second edges.

The core assembly also includes a top panel which extends over the honeycomb structure generally parallel to and spaced apart from the bottom panel of the tray. The top panel includes an upper surface, a first edge which extends adjacent to and spaced apart from the first edge of the bottom panel and a second edge which extends adjacent to and spaced apart from the second edge of the bottom panel. The top panel also extends between the opposing flanges of the channel members of the tray. The core assembly includes a first chamber located between the top panel and the bottom panel at the first edges of the top and bottom panels, and a second chamber located between the top panel and the bottom panel at the second edges of the top and bottom panels.

The modular work top panel also includes first and second edge members. Each edge member includes a body portion having an upper lip and a tongue extending outwardly from the body portion. The tongue of the first edge member is adapted to be inserted within the first chamber between the top and bottom panels such that the body portion is located exterior of the first chamber. The upper lip of the body portion of the first member is adapted to project upwardly from the first edge member above the upper surface of the top panel and along the first edge of the top panel. The tongue of the second edge member is adapted to be inserted within the second chamber between the top and bottom panels with the body portion of the second edge member being located exterior of the second chamber. The upper lip of the body portion of the second edge member projects upwardly from the second edge member above the upper surface of the top panel adjacent to the second edge thereof. The opposing upper lips of the first and second edge members form a recess therebetweeen above the upper surface of the top panel which is adapted to receive one of a plurality of different types of work surface panels as desired. The work surface panel is typically a wood veneer or a plastic laminate. The edge members are preferably made from wood such that the body portions may be formed to a desired shape or contour by wood cutting machinery, such as a router, prior to or after attachment of the edge members to the core assembly. A decorative trim piece may additionally be selectively attached to the body portion of edge members formed to be attachable thereto, if desired.

BRIEF DESCRIPTION OF THE DRAWINGS

FIG. 4 is an exploded isometric view of the work top panel with an unformed edge blank.

FIG. 5 is a side view of a formed edge member.

FIG. 6 is a side view of an edge member having an alternate configuration.

FIG. 7 is a side view of an edge member having another configuration.

FIG. 8 is a side view of an edge member having a trim piece attached thereto.

FIG. 9 is a side view of an edge member having a trim piece with an alternate configuration attached thereto.

DESCRIPTION OF THE PREFERRED EMBODIMENTS

Figure 1:
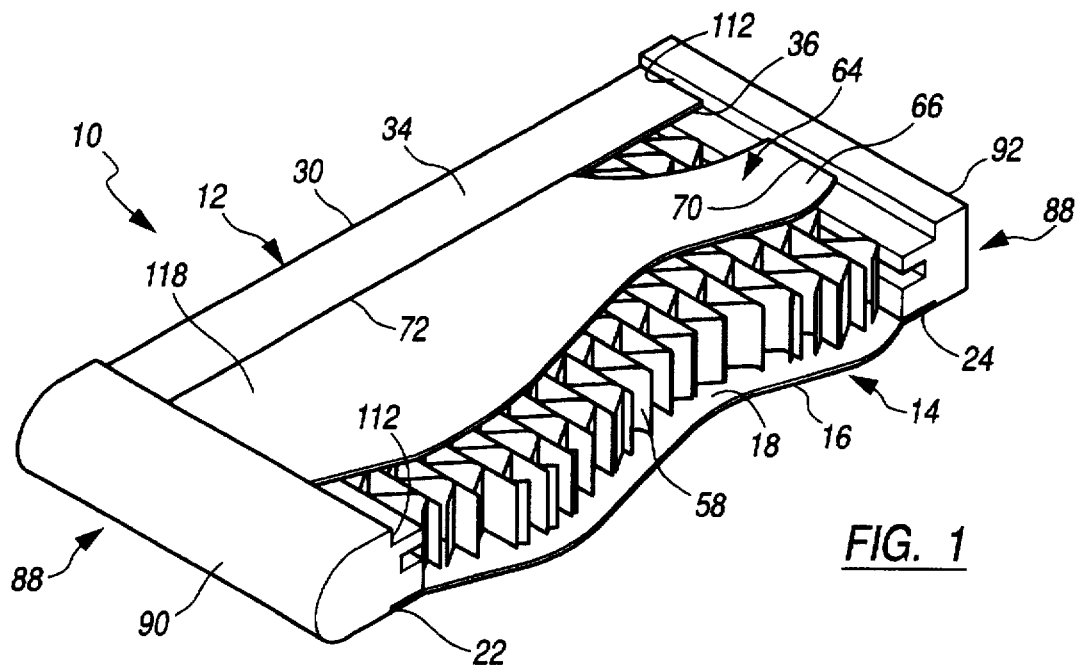
FIG. 1 is an isometric cut-away view of the work top panel of the present invention.

The modular work top panel 10 of the present invention is adapted for use as the top of a desk, table or other article of furniture. The top panel 10 includes a core assembly 12. The core assembly 12 includes a tray 14 having a generally planar bottom panel 16. The bottom panel 16 includes an interior surface 18 and an opposing exterior surface 20. The bottom panel 16 is generally rectangular and extends between a generally linear front edge 22 and an opposing linear rear edge 24 which extends generally parallel to and spaced apart from the front edge 22. The bottom panel 16 also extends between a generally linear left edge 26 and a generally linear right edge 28 which extends generally parallel to and spaced apart from the left edge 26.

The tray 14 also includes a generally L-shaped left channel member 30. The left channel member 30 includes a generally rectangular and planar wall 32 which extends along and upwardly from the left edge 26 of the bottom panel 16 at a generally perpendicular angle thereto. A generally planar and rectangular flange 34 extends inwardly from the top edge of the wall 32 to a linear interior edge 36. The flange 34 is generally parallel to and spaced apart from the bottom panel 16. The tray 14 also includes a generally L-shaped right channel member 44. The right channel member 44 includes a generally rectangular and planar wall 46 which is attached to and extends along the length of the right edge 28 of the bottom panel 16 and which extends upwardly therefrom at an angle generally perpendicular to the bottom panel 16. The right channel member 44 also includes a generally rectangular and planar flange 48 which extends inwardly from the top edge of the wall 46 to a generally linear interior edge 50. The flange 48 is spaced apart from and extends generally parallel to the bottom panel 16 and to the flange 34.

The core assembly 12 also includes a rectangular honeycomb structure 58 which is generally light-weight and rigid. The honeycomb structure 58 may be formed from paper, cardboard, plastic or other materials as desired. The honeycomb structure 58 is located on the interior surface 18 of the panel 16 and may be secured thereto by suitable adhesives if desired. The honeycomb structure 58 has a height which enables the honeycomb structure 58 to fit closely between the bottom panel 16 and the flanges 34 and 48 of the channel members 30 and 44. The honeycomb structure 58 extends from the wall 32 of the left channel member 30 to the wall 46 of the right channel member 44. The honeycomb structure 58 also extends between positions adjacent to the left edge 26 and right edge 28 of the bottom panel 16. The edges of the honeycomb structure 58 are spaced apart from the left edge 26 and right edge 28 thereby leaving a portion of the interior surface 18 of the bottom panel 16 exposed at and along the edges 26 and 28 to form respective chambers as described below. The core assembly 12 also includes a generally rectangular and planar top panel 64 having an upper surface 66. The top panel 64 is placed on top of the honeycomb structure 58 and may be secured thereto by various types of adhesives or other fastening means. The top panel 64 extends between a generally linear front edge 68 and a generally linear rear edge 70 which is spaced apart from and extends generally parallel to the front edge 68. The top panel 64 also extends between a generally linear left edge 72 and a generally linear right edge 74 which is spaced apart from and extends generally parallel to the left edge 72. The left edge 72 of the top panel 64 abuts and extends along the interior edge 36 of the flange 34 of the left channel member 30 and the right edge 74 of the top panel 64 abuts and extends along the interior edge 50 of the flange 48 of the right channel member 44. The front edge 68 of the top panel 64 is located vertically above and extends generally parallel to and spaced apart from the front edge 22 of the bottom panel 16. The rear edge 70 of the top panel 64 is located vertically above and is spaced apart from and extends generally parallel to the rear edge 24 of the bottom panel 16. The top panel 64 and the tray 14 of the disclosed embodiment are preferably made from 0.030 inch thick electrogalvanized steel plate, or in other thicknesses or with other metals, or with other materials, such as plastic, as desired. The use of the light-weight honeycomb structure 58 between the panels 16 and 64 provides a core assembly 12 which achieves a durable and sturdy light-weight work surface which overcomes the problems encountered with the use of heavy work surface materials such as particleboard or plywood.

The core assembly 12 includes a front chamber 78 formed between the top panel 64 and the bottom panel 16 adjacent the front edges 68 and 22 thereof and between the left channel member 30 and the right channel member 44. The front chamber 78 extends from the front edges 22 and 68 inwardly to the honeycomb structure 58. A rear chamber 80 is formed between the top panel 64 and the bottom panel 16 adjacent the rear edges 70 and 24 thereof and between the left channel member 30 and the right channel member 44. The rear chamber 80 extends from the rear edges 70 and 24 of the top panel 64 and bottom panel 16 to the honeycomb structure 58. Although the core assembly 12 has been described as generally rectangular, it may also be formed in other shapes as desired such as circular, elliptical, triangular or various curved and polygonal shapes.

Figure 2:
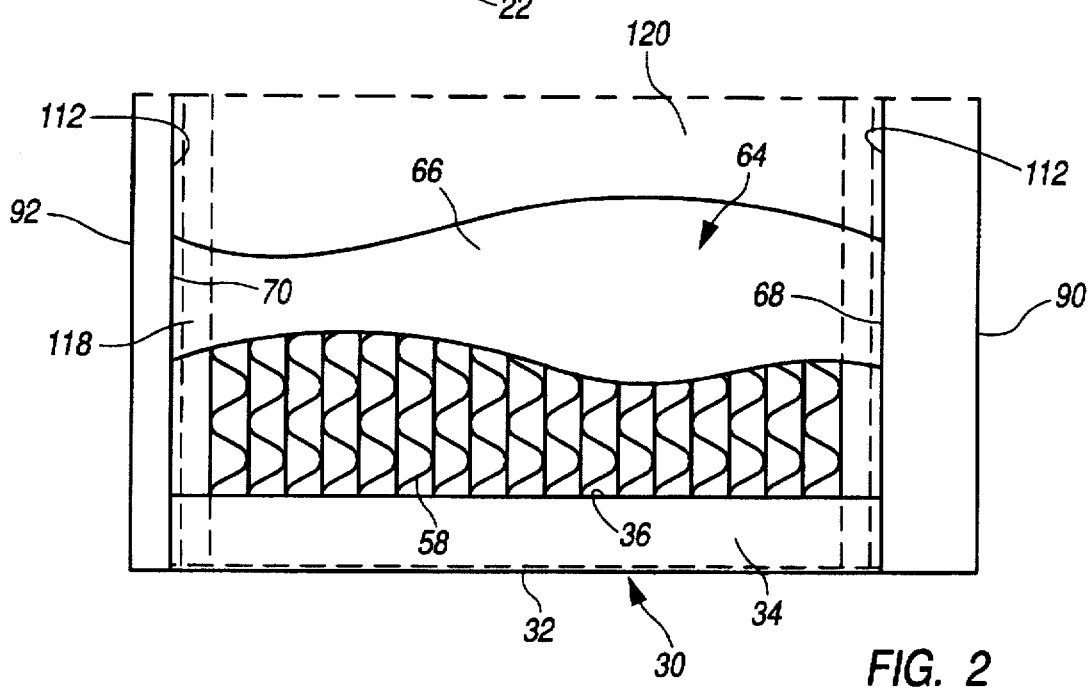
FIG. 2 is a cut-away top view of the work top panel.
Figure 3:
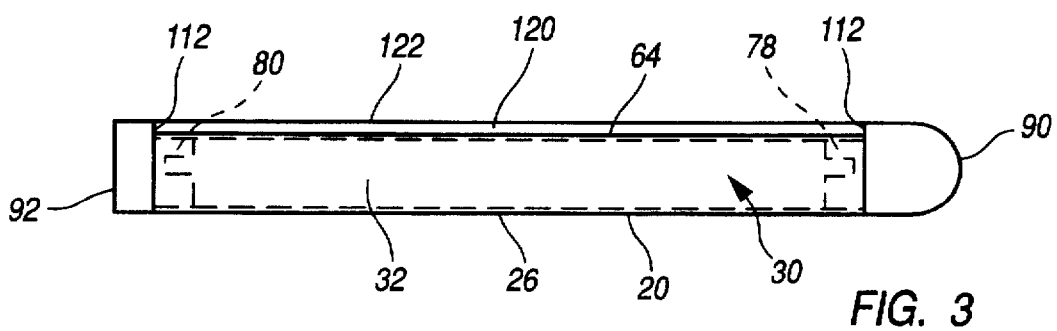
FIG. 3 is a side view of the work top panel.

The top panel 10 also includes one or more edge members 88. As shown in FIGS. 1–3, the edge members 88 of the top panel 10 include a front edge member 90 and a rear edge member 92. Each edge member 88 is elongate extending between a first end 96 and a second end 98. As best shown in FIG. 5, each edge member 88 includes a main body portion 100 which extends between the first and second ends 96 and 98 and an elongate tongue 102 which extends outwardly from and along the body portion 100. The tongue 102 is generally rectangular such that the tongue 102 may be inserted into the front chamber 78 or rear chamber 80 of the core assembly 12 such that the tongue 102 extends between the top panel 64 and bottom panel 16 and between the left channel member 30 and right channel member 44. The tongue 102 may include an elongate groove 104.

The body portion 100 of the edge members 88 includes an exterior surface 105. The exterior surface 105 includes an upper surface 106, a lower surface 108, and a front surface 110 which extends between the upper surface 106 and lower surface 108. The body portion 100 also includes an elongate upper shoulder 112 which extends from the tongue 102 to the upper surface 106, an elongate lower lip 114 which extends from the tongue 102 to the lower surface 108, and two end lips 116 which respectively extend between the tongue 102 and the body portion 100 at each end 96 and 98 of the edge member 88. The upper shoulder 112 is adapted to abut and extend along the front or rear edge 68 or 70 of the top panel 64 and the ends of the flanges 34 and 48 of the channel members 30 and 44. The lower lip 114 is adapted to abut and extend along the front or rear edge 22 or 24 of the bottom panel 16. The end lips 116 are adapted to abut and extend along the ends of the walls 32 and 46 of the channel members 30 and 44.

The tongue 102 of the front edge member 90 is inserted into the front chamber 78 and is secured to the core assembly 12 by fasteners such as screws or by a suitable adhesive. The tongue 102 of the rear edge member 92 is inserted into the rear chamber 80 of the core assembly 12 and is also secured thereto by suitable fasteners or adhesives. The body portions 100 of the front and rear edge members 90 and 92 are located to the exterior of the core assembly 12. The upper shoulder 112 of the front edge member 90 and the upper shoulder 112 of the rear edge member 92 extend upwardly above the upper surface 66 of the top panel 64 creating a planar and rectangular recess 118 therebetween. The recess 118 is adapted to receive one of various types of a work surface panel 120 as may be desired. The work surface panel extends between the upper shoulders 112 of the front and rear edge members 90 and 92 and covers the entire top panel 64 and flanges 34 and 48 of the channel members 30 and 44. The upper surface 122 of the work surface panel 120 is flush or coplanar with the upper surfaces 106 of the front and rear edge members 90 and 92. The heights of the upper shoulders 112 of the edge members 90 and 92 may be adjusted as desired to accommodate work surface panels 120 having various different thicknesses. The work surface panel 120 may be attached to the top panel 64 and channel members 30 and 44 by suitable adhesives which are well known in the art. The work surface panel 120 may be chosen from various different types of panels and may be made from various types of woods, wood veneers, metal sheets, or plastic laminates, each which may include various different surface finishes and patterns.

The edge members 88 may also be made of various different types of materials as desired such as wood, plastic or other formable materials which are well known. The edge members 88 are preferably made of a formable material such as wood which allows the exterior surface 105 of the edge member 88 to be selectively formed, preferably by routing, to a desired configuration prior to or after attachment to the core assembly 12 with wood working machinery or the like. The edge members 88 may also be extruded plastic, or extrudable metal, such as aluminum. The body portions 100 of the edge members 88 may be formed in various different configurations as desired, such as generally rounded, as shown in FIGS. 5 and 7, or generally rectangular, as shown in FIG. 6. In addition, as shown in FIGS. 8 and 9, the edge member 88 may include an elongate groove 126 which is adapted to receive a tongue 128 of a trim piece 130. The trim piece 130 may be made from plastic, wood or other materials and may be formed in various different configurations and colors, as desired. Thus, as shown in FIGS. 8 and 9, the same edge member 88 may be fitted with one of various different configurations of trim pieces 130.

Initially a quantity of core assemblies 12 may be formed and held separately in inventory. A plurality of different types of work surface panels 120, formed with different materials, patterns and finishes as may be desired by customers, may also be held separately in inventory, along with a plurality of different types of edge members 88 formed in various different types of materials and in various different types of configurations. The edge members 88 may also be stored as unformed blanks, as shown in FIG. 4. The desired type of edge members 88 may be secured to a core assembly 12 and the desired type of work surface panel 120 may be quickly and easily secured to the core assembly 12 to create a top panel 10 with the desired materials, configuration and finish as desired by the customer. Thus if a customer desires a top panel 10 having rounded edge members 88, such a panel can be quickly and easily assembled in response to the customer's demands.

As an alternative to maintaining a wide variety of edge members 88 of various different configurations in inventory, a plurality of edge members 88 having the same blank configuration, such as rectangular or rounded, may be held in inventory. Each edge member 88 may be subsequently formed into a different desired configuration by wood cutting machinery, such as routers, and/or similar devices, either prior to or after attachment to the core assembly 12.

The assembled top panel 10 is adapted to be connected to a support structure, such as a vertical table or desk leg, or a panel, at each end of the panel 10 adjacent the channel members 30 and 44. The channel members may alternatively be abutted against and connected to a wall. In addition, while the top panel 10 has been described herein as including front and rear edge members 90 and 92, the top panel 10 may include only one edge member 88 or a continuous edge member 88 which extends around the full periphery of the panel 10. In the latter alternate, the channel members 30 and 44 may be eliminated and replaced by edge chambers similar to the chambers 78 and 80 for the receipt of left and right edge members.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A modular panel comprising:

a tray having a bottom panel, said bottom panel having a first edge;

a top panel extending substantially parallel to and spaced apart from said bottom panel, said top panel including an upper surface and a first edge which extends generally parallel to and spaced apart from said first edge of said bottom panel, said top panel and said bottom panel forming a first chamber therebetween at said first edges of said top and bottom panels;

a first edge member including a body portion having an upper shoulder, said first edge member adapted to be inserted within said first chamber between said top and bottom panels with said body portion located exterior of said first chamber, said upper lip of said body portion adapted to project from said edge member above said upper surface of said top panel thereby forming a recess above said upper surface of said top panel, said recess having a depth equal to the height of said upper shoulder;

a work surface panel located on top of said upper surface of said top panel and having a thickness equal to said depth of said recess, said recess adapted to receive said work surface panel.

2. The modular panel of claim 1 wherein said top panel includes a second edge and said bottom panel includes a second edge, said top panel and said bottom panel forming a second chamber therebetween at said second edges.

3. The modular panel of claim 2 including a second edge member including a body portion having an upper shoulder, said second edge member adapted to be inserted into said second chamber while said body portion remains exterior to said second chamber, said upper shoulder of said second edge member adapted to project from said second edge member above said upper surface of said top panel, said upper shoulder of said first edge member and said upper shoulder of said second edge member forming said recess adapted to receive a work surface panel.

4. The modular panel of claim 1 including a honeycomb structure located between said top panel and said bottom panel.

5. The modular panel of claim 1 wherein said tray includes first and second channel members respectively attached to opposite ends of said bottom panel.

6. The modular panel of claim 5 wherein each said channel member includes an inwardly extending flange spaced apart from, said bottom panel.

7. The modular panel of claim 6 wherein said top panel extends between said flanges of said first and second channel members of said tray.

8. The modular panel of claim 1 including a trim piece selectively attachable to said first edge member.

9. The modular panel of claim 8 wherein said body portion of said first edge member includes a groove and said trim piece includes a tongue adapted for insertion into said groove.

10. The modular panel of claim 1 wherein said first edge member includes a lower lip, said upper shoulder of said first edge member adapted to abut said first edge of said top panel and said lower lip of said first edge member adapted to abut said first edge of said bottom panel.

11. The modular panel of claim 1 wherein said first edge member is formed from a formable material such that said body portion of said first edge member may be formed into various different configurations as desired either prior to or after said first edge member is inserted into said first chamber.

12. The modular panel of claim 1 wherein said first edge member includes a tongue, said tongue adapted to be inserted into said first chamber.

13. A method of forming a work top panel comprising the steps of:

providing a core assembly having a bottom panel and a spaced apart top panel, said top and bottom panels forming a chamber therebetween;

forming an edge member to have a body portion and a recess having a depth, attaching said edge member to said core assembly by inserting said edge member into said chamber;

forming a work surface panel having a depth substantially equal to said recess; and attaching said work surface panel to said top panel and locating said work surface panel to be received at said recess.

14. The method of claim 13 including forming the exterior surface of said body portion to a different configuration after said edge member is attached to said core assembly.

15. The method of claim 13 including the step of inserting a honeycomb structure between said top panel and said bottom panel of said core assembly.

16. The method of claim 13 including the step of forming said body portion of said edge member to a different configuration prior to attaching said edge member to said core assembly.

* * * * *